United States Patent [19]

Aitken

[11] Patent Number: 5,021,366
[45] Date of Patent: Jun. 4, 1991

[54] FLUORINE-FREE PHOSPHATE GLASSES

[75] Inventor: Bruce G. Aitken, Painted Post, N.Y.

[73] Assignee: Corning Incorporated, Corning, N.Y.

[21] Appl. No.: 599,751

[22] Filed: Oct. 19, 1990

[51] Int. Cl.$^5$ .......................... C03C 3/16; C03C 3/17; C03C 4/00

[52] U.S. Cl. ...................................... 501/45; 501/48; 501/900; 501/903

[58] Field of Search .................... 501/45, 48, 900, 903

[56] References Cited

U.S. PATENT DOCUMENTS

| | | | |
|---|---|---|---|
| 3,407,091 | 10/1968 | Busdiecker | 501/45 |
| 3,979,322 | 9/1976 | Alexeeu et al. | 501/45 |
| 4,026,714 | 5/1977 | Lewis | 501/48 |
| 4,248,732 | 2/1981 | Myers et al. | 501/45 |
| 4,362,819 | 12/1982 | Olszowski | 501/44 |
| 4,439,530 | 3/1984 | Tajima | 501/45 |
| 4,481,023 | 11/1984 | Marechal et al. | 65/64 |
| 4,874,724 | 10/1989 | Beall et al. | 501/48 |
| 4,940,677 | 7/1990 | Beall et al. | 501/45 |

Primary Examiner—Mark L. Bell
Attorney, Agent, or Firm—C. S. Janes, Jr.

[57] ABSTRACT

This invention is drawn particularly to the production of glasses having essentially fluorine-free compositions consisting essentially, in mole percent, of:

| | | | |
|---|---|---|---|
| $Li_2O$ | 5–10 | $P_2O_5$ | 30–36 |
| $Na_2O$ | 5–15 | $Al_2O_3$ | 0–5 |
| $K_2O$ | 0–6 | $CeO_2$ | 0–2 |
| $Li_2O + Na_2O + K_2O$ | 15–25 | $SnO$ | 0–20 |
| $ZnO$ | 10–33 | $PbO$ | 0–20 |
| $CaO$ | 0–20 | $Sb_2O_3$ | 0–12 |
| $SrO$ | 0–20 | $Bi_2O_3$ | 0–6 |
| $BaO$ | 0–20 | $SnO + PbO + Sb_2O_3 + Bi_2O_3$ | 0–20. |
| $CaO + SrO + BaO$ | 12–25 | | |

8 Claims, No Drawings

FLUORINE-FREE PHOSPHATE GLASSES

RELATED APPLICATION

U.S. Ser. No. 599,743, filed concurrently by me under the title PHOSPHATE GLASSES FOR GLASS MOLDS, is directed to the production of glasses consisting essentially, in mole percent, of 34–56% ZnO, 4–14% $Al_2O_3$, and 40–52% $P_2O_5$, which are particularly designed for use as molds in the pressing of optically finished glass lenses.

BACKGROUND OF THE INVENTION

A process for pressing optically finished glass lenses is described in U.S. Pat. No. 4,481,023 (Marechal et al.). Optically finished glass lenses pressed in accordance with the process described therein have been marketed commercially by Corning Incorporated, Corning, N.Y., utilizing alkali metal fluoroaluminophosphate compositions disclosed in U.S. Pat. No. 4,362,819 (Olszewski et al.). The latter glass compositions are suitable for that purpose because they exhibit low transition temperatures (Tg) while demonstrating good chemical durability and resistance to weathering. Nevertheless, the presence of fluorine in the compositions gives rise to three serious practical problems. To illustrate:

As was explained in U.S. Ser. No. 599,743, supra, fluorine can attack the surfaces of the molds. Also, volatilization of fluorine during melting of the glass batch creates environmental hazards. Moreover, volatilization of fluorine from the surface of cooling glass bodies of the type described in U.S. Pat. No. 4,362,819 necessitates the removal of a fluorine-depleted surface layer therefrom through mechanical means prior to the pressing operation, which not only adds a time-consuming and expensive step to the process, but also exerts a negative impact on glass utilization.

Accordingly, the primary objective of the present invention was to devise glass compositions exhibiting properties similar to those demonstrated by the glasses disclosed in U.S. Pat. No. 4,362,819, but which would be free of fluorine.

More particularly, the primary goal of the present invention was to develop chemically durable, weather resistant, essentially fluorine-free glasses with annealing points within the temperature range of about 300°–340° C., thereby enabling them to be molded into lenses at temperatures on the order of 360°–400° C., and with refractive indices of about 1.605 and linear coefficients of thermal expansion (25°–300° C.) between $145$–$170 \times 10^{-7}/°C$.

SUMMARY OF THE INVENTION

That goal can be achieved within narrow composition intervals of the $R_2O$—$RO$—$ZnO$—$P_2O_5$ system, wherein $R_2O$ consists of $Li_2O$, $Na_2O$, $K_2O$, or a combination thereof, and RO consists of CaO, SrO, BaO, or a combination thereof. More specifically, the glasses of the instant invention consist essentially, expressed in terms of mole percent on the oxide basis, of

| | | | |
|---|---|---|---|
| $Li_2O$ | 5–10 | $P_2O_5$ | 30–36 |
| $Na_2O$ | 5–15 | $Al_2O_3$ | 0–5 |
| $K_2O$ | 0–6 | $CeO_2$ | 0–2 |
| $Li_2O + Na_2O + K_2O$ | 15–25 | SnO | 0–20 |
| ZnO | 10–33 | PbO | 0–20 |
| CaO | 0–20 | $Sb_2O_3$ | 0–12 |
| SrO | 0–20 | $Bi_2O_3$ | 0–6 |
| BaO | 0–20 | $SnO + PbO + Sb_2O_3 + Bi_2O_3$ | 0–20 |
| $CaO + SrO + BaO$ | 12–25 | | |

As defined herein, essentially fluorine-free indicates that no material containing substantial levels of fluorine is intentionally included in the glass.

The demanded matrix of physical and chemical properties is secured via straitly controlling the amounts and inter-relationships existing between the individual ingredients. To illustrate:

The annealing point of the glasses can be lowered by increasing the alkali metal oxide content and/or by employing PbO or SnO as a refractive index raising oxide. The annealing point can be raised by replacing part of the ZnO or $P_2O_5$ with $Al_2O_3$.

The linear coefficient of thermal expansion of the glasses can be raised by using PbO as an index raising oxide and/or by replacing part of the ZnO with BaO. The coefficient can be reduced by utilizing $Sb_2O_3$ or SnO as an index raising oxide and/or by replacing part of the ZnO or $P_2O_5$ with $Al_2O_3$ and/or CaO.

$Bi_2O_3$ can be employed to raise the refractive index of the glasses and $CeO_2$ can be incorporated to render the glasses resistant to various radiations, e.g., X-radiations.

The inclusion of at least 12% total of $CaO+SrO+BaO$ has been found to be essential in order to impart good chemical durability and weatherability to the glasses. They also act to raise the refractive index of the glasses without increasing dispersion therein, and to increase the annealing point of the glasses. Nevertheless, excessive levels of BaO or SrO render the glasses prone to devitrification. The use of CaO inhibits this tendency. Accordingly, the preferred glasses will contain CaO in concentrations somewhat greater than those of SrO and/or BaO.

Small amounts of SnO, viz., 1–2%, have been found to be especially effective in conferring good weathering resistance to the glasses.

Of the four components preferably employed as index raising constituents, i.e., $Bi_2O_3$, PbO, $Sb_2O_3$, and SnO, $Sb_2O_3$ is the most preferred because it is less prone to reduction than either $Bi_2O_3$ or PbO; PbO-containing glasses generally have higher linear coefficients of thermal expansion; and less $Sb_2O_3$ is required than SnO to raise the index to a desired value.

$Al_2O_3$ is typically included in order to impart improved chemical durability and/or weatherability to the glasses. Nonetheless, the level of $Al_2O_3$ will not exceed 5% in order to retain the annealing point of the glasses within the desired upper limit. In general, the $Al_2O_3$ content will be held at 3.5% and below.

Whereas it is not mathematically possible to convert composition ranges expressed in terms of mole percent to exact composition ranges expressed in terms of weight percent, the following values represent approximations of the base compositions of the inventive glasses in terms of weight percent:

| | | | |
|---|---|---|---|
| $Li_2O$ | 0.9–3.5 | $P_2O_5$ | 25.8–56.7 |
| $Na_2O$ | 1.9–10.8 | $Al_2O_3$ | 0–5.8 |
| $K_2O$ | 0–6.4 | $CeO_2$ | 0–3.9 |
| $Li_2O + Na_2O + K_2O$ | 3.7–17.9 | SnO | 0–29.8 |
| ZnO | 4.9–30.4 | PbO | 0–38.6 |
| CaO | 0–13.0 | $Sb_2O_3$ | 0–31.3 |
| SrO | 0–21.6 | $Bi_2O_3$ | 0–25.5 |
| BaO | 0–29.0 | $SnO + PbO + Sb_2O_3 + Bi_2O_3$ | 0–48.6 |

-continued

| CaO + SrO + BaO | 4-33.5 | $Sb_2O_3 + Bi_2O_3$ | |

PRIOR ART

U.S. Pat. No. 3,979,322 (Alexeev et al.) is drawn to glasses for use in laser applications consisting essentially, in mole percent, of 1-30% alkali metal oxides, 20-45% Group II metal oxides, 0.1-25% $Nd_2O_3$, 35-49% $P_2O_5$, and 0-27% $Al_2O_3$ and/or $B_2O_3$ and/or $Nb_2O_5$ and/or PbO. Although partial overlap is possible between those broad ranges and the relatively narrow composition intervals in the present inventive glasses, no mention is made of glasses especially designed for pressing lenses and none of the working examples furnished in the patent had a composition even remotely close to the ranges of the present inventive glasses.

U.S. Pat. No. 4,248,732 (Myers et al.) discloses glasses designed for laser use consisting essentially, in mole percent, of 5-40% alkali metal oxides, 5-30% Group II oxides, 0.1-15% $R_2O_3$, 35-65% $P_2O_5$, and 0.01-7% $Nd_2O_3$. Whereas there can be partial overlap between those very extensive ranges and the relatively narrow composition intervals of the instant inventive glasses, no reference is made to glasses particularly suitable for pressing lenses therefrom and none of the working examples supplied in the patent had a composition even marginally close to the ranges required in the instant inventive glasses.

U.S. Pat. No. 4,439,530 (Tajima) describes optical glasses having base compositions consisting essentially, in weight percent, of 3-30% $Na_2O$ and/or $K_2O$, 8-65% PbO, 1-45% $Ta_2O_5$, and 18-38% $P_2O_5$, and which optionally may contain up to 3% $Li_2O$, up to 3% $Al_2O_3$, up to 25% ZnO and up to 25% CaO+SrO+BaO+MgO+SnO. Yet again, although there is a possibility of partial overlap between those broad ranges and the more restricted composition intervals of the instant inventive glasses (with the exception of the $Ta_2O_5$ content), there is no discussion of glasses expressly devised for pressing lenses therefrom. Moreover, each of the recorded working examples has a composition far removed from the ranges of the present inventive glasses.

U.S. Pat. No. 4,874,724 (Beall et al.) reports the preparation of glass-ceramic articles via heat treating precursor glass articles consisting essentially, in mole percent, of 5-25% $R_2O$, wherein $R_2O$ consists of 5-25% $Li_2O$, 0-15% $Na_2O$, and 0-10% $K_2O$, 0.75-6% $Al_2O_3$, 35-50% ZnO, and 29-37% $P_2O_5$. Optionally, up to 20% total of at least one member of the group in the indicated proportion consisting of up to 10% CaO, MgO, MnO, or mixtures thereof, up to 15% $Cu_2O$, PbO, SnO, or mixtures thereof, and up to 3% $SiO_2$. The concentrations of ZnO are greater than those suitable in the present inventive glasses and those of CaO+SrO+BaO are below. Because of those factors, none of the working examples recorded in the patent has a composition coming within the ranges of the instant inventive glasses.

U.S. Pat. No. 4,940,677 (Beall et al.) is concerned with glasses consisting essentially, in mole percent, of at least 65% total of 23-55% ZnO, 28-40% $P_2O_5$, and 10-35% $R_2O$, wherein $R_2O$ consists of at least two alkali metal oxides in the indicated proportion selected from the group of 0-25% $Li_2O$, 0-25% $Na_2O$, and 0-25% $K_2O$, and up to 35% total of optional constituents in the indicated proportion selected from the group consisting of:

| $Al_2O_3$ | 0-6 | $ZrO_2$ | 0-5 |
| $B_2O_3$ | 0-8 | $SiO_2$ | 0-4 |
| $Al_2O_3 + B_2O_3$ | 0-8 | MgO | 0-10 |
| $Cu_2O$ | 0-15 | CaO | 0-10 |
| F | 0-5 | SrO | 0-10 |
| PbO | 0-35 | BaO | 0-12 |
| SnO | 0-35 | MnO | 0-10 |
| PbO + SnO | 0-35 | MgO + CaO + SrO + BaO + MnO | 0-15 |

Whereas partial overlap is possible between those very broad composition intervals and the ranges required to produce the present inventive glasses, none of the working examples reported in the patent has a composition coming within the ranges required for the instant inventive glasses.

DESCRIPTION OF PREFERRED EMBODIMENTS

Table I lists a group of glass compositions melted on a laboratory scale and reported in terms of parts by weight illustrating the parameters of the present invention. Because the sum of the individual components totals or very closely approximates 100, for all practical purposes the tabulated values may be considered to represent weight percent. Table IA records the same group of glass compositions expressed in terms of mole percent on the oxide basis. The actual batch ingredients may comprise any materials, either oxides or other compounds, which, upon being melted together, will be converted into the desired oxides in the proper proportion. For example, zinc orthophosphate may be employed as a source of ZnO and $P_2O_5$ and $Li_2CO_3$ and $BaCO_3$ may comprise the sources of $Li_2O$ and BaO, respectively.

The batch ingredients were compounded, tumble mixed together to assist in securing a homogeneous melt, and then charged into platinum crucibles. After placing lids thereon, the crucibles were introduced into a furnace operating at about 1000°-1200° C. and the batches melted for about 3 hours. The melts were subsequently poured into steel molds to yield glass slabs having dimensions of about 6"×4"×0.5" which were transferred immediately to an annealer operating at about 300°-325° C.

(Whereas the above description reflects laboratory scale melting only, it must be recognized that large scale melts thereof can be conducted in commercial melting units. It is only necessary that the batch materials be melted at a temperature and for a time sufficient to achieve a homogeneous melt.)

TABLE I

| (Parts by Weight) | | | | | | | | |
|---|---|---|---|---|---|---|---|---|
| | 1 | 2 | 3 | 4 | 5 | 6 | 7 | 8 |
| $Li_2O$ | 1.8 | 1.8 | 2.0 | 1.8 | 1.9 | 2.0 | 1.9 | 1.8 |
| $Na_2O$ | 5.0 | 4.4 | 4.7 | 4.7 | 4.5 | 4.8 | 5.6 | 4.3 |
| $K_2O$ | 4.1 | 4.1 | 4.5 | 4.1 | 4.2 | 4.5 | 4.2 | 4.1 |
| ZnO | 16.9 | 14.3 | 17.9 | 18.2 | 18.1 | 21.2 | 20.7 | 16.0 |
| BaO | 19.1 | 10.1 | — | 19.5 | 10.3 | — | 19.4 | 20.1 |
| CaO | — | 3.7 | 8.0 | — | 3.8 | 8.1 | — | — |
| PbO | 11.6 | 16.6 | 18.5 | — | — | — | — | — |
| $Sb_2O_3$ | — | — | — | 8.8 | 11.8 | 14.1 | — | — |
| $Al_2O_3$ | 1.5 | 1.3 | — | 1.3 | 0.7 | — | — | — |
| $P_2O_5$ | 39.9 | 43.6 | 44.4 | 41.5 | 44.6 | 45.2 | 39.8 | 43.4 |
| $Bi_2O_3$ | — | — | — | — | — | — | 8.3 | — |
| SnO | — | — | — | — | — | — | — | 9.9 |
| | 9 | 10 | 11 | 12 | 13 | 14 | 15 | 16 |

TABLE I-continued (Parts by Weight)

|  | | | | | | | | |
|---|---|---|---|---|---|---|---|---|
| Li₂O | 1.9 | 1.8 | 1.8 | 1.8 | 2.0 | 1.9 | 1.9 | 1.8 |
| Na₂O | 4.5 | 4.4 | 4.2 | 4.2 | 4.7 | 4.5 | 4.4 | 4.3 |
| K₂O | 4.3 | 4.1 | 4.0 | 4.0 | 4.4 | 4.2 | 4.2 | 4.1 |
| ZnO | 8.3 | 8.9 | 12.0 | 17.6 | 18.3 | 14.5 | 18.0 | 17.8 |
| BaO | 8.7 | 16.8 | 19.6 | 19.7 | — | 10.2 | 9.4 | 13.7 |
| CaO | 9.6 | 6.1 | 2.4 | — | 7.9 | 3.7 | 3.8 | 1.8 |
| PbO | 17.0 | 13.7 | 12.4 | — | — | 16.0 | — | — |
| Sb₂O₃ | — | — | — | 9.3 | 15.7 | — | 12.4 | 10.8 |
| Al₂O₃ | 0.4 | 0.4 | 1.0 | 0.8 | 0.2 | 2.5 | 0.5 | 0.6 |
| P₂O₅ | 45.2 | 43.5 | 42.4 | 42.5 | 46.6 | 42.7 | 44.4 | 43.4 |
| CeO₂ | — | — | — | — | — | — | 1.0 | 1.5 |

|  | 17 | 18 | 19 | 20 | 21 | 22 | 23 | 24 |
|---|---|---|---|---|---|---|---|---|
| Li₂O | 1.8 | 1.9 | 2.0 | 2.0 | 1.9 | 1.9 | 1.9 | 2.1 |
| Na₂O | 4.4 | 4.5 | 4.8 | 4.6 | 4.5 | 4.4 | 5.7 | 5.1 |
| K₂O | 4.2 | 4.3 | 4.5 | 4.4 | 4.3 | 4.2 | 4.3 | 4.8 |
| ZnO | 14.4 | 18.3 | 18.7 | 18.6 | 14.6 | 15.6 | 16.9 | 37.3 |
| BaO | 9.2 | 10.4 | — | 5.4 | 5.3 | 10.3 | 30.2 | — |
| CaO | 3.7 | 3.8 | 8.1 | 5.9 | 5.8 | 3.8 | — | — |
| SnO | — | 1.4 | 2.2 | 1.4 | 1.4 | 2.0 | — | — |
| PbO | 15.9 | — | — | — | 15.1 | 13.0 | — | — |
| Sb₂O₃ | — | 9.7 | 11.7 | 11.0 | — | — | — | — |
| Al₂O₃ | 1.6 | 0.6 | 0.3 | 0.4 | 1.9 | 0.5 | — | — |
| P₂O₅ | 43.7 | 45.1 | 47.6 | 46.3 | 45.4 | 44.4 | 40.9 | 50.7 |
| CeO₂ | 1.0 | — | — | — | — | — | — | — |

|  | 25 | 26 | 27 | 28 | 29 | 30 |
|---|---|---|---|---|---|---|
| Li₂O | 1.8 | 2.0 | 1.9 | 1.9 | 1.8 | 2.1 |
| Na₂O | 4.4 | 4.3 | 4.4 | 4.4 | 4.4 | 4.9 |
| K₂O | 6.7 | 4.8 | 4.2 | 4.2 | 4.1 | 4.7 |
| ZnO | 37.3 | 35.1 | 23.3 | 19.7 | 26.8 | 32.2 |
| BaO | — | — | — | 6.9 | — | — |
| CaO | — | — | — | 2.5 | — | — |
| PbO | — | — | 19.8 | 16.0 | — | — |
| Sb₂O₃ | — | — | — | — | 19.2 | — |
| Al₂O₃ | 2.1 | 1.5 | 2.5 | — | — | — |
| P₂O₅ | 47.7 | 47.3 | 44.0 | 44.4 | 43.6 | 56.2 |
| CeO₂ | — | 5.1 | — | — | — | — |

TABLE IA (Mole %)

|  | 1 | 2 | 3 | 4 | 5 | 6 | 7 | 8 |
|---|---|---|---|---|---|---|---|---|
| Li₂O | 7.0 | 7.0 | 7.0 | 7.0 | 7.0 | 7.0 | 7.1 | 7.0 |
| Na₂O | 9.4 | 8.0 | 8.0 | 8.7 | 8.0 | 8.0 | 10.4 | 8.0 |
| K₂O | 5.0 | 5.0 | 5.0 | 5.0 | 5.0 | 5.0 | 5.1 | 5.0 |
| ZnO | 24.0 | 20.0 | 23.3 | 25.8 | 24.8 | 27.0 | 29.0 | 22.5 |
| BaO | 14.4 | 7.5 | — | 14.7 | 7.5 | — | 14.4 | 15.0 |
| CaO | — | 7.5 | 15.0 | — | 7.5 | 15.0 | — | — |
| PbO | 6.0 | 8.5 | 8.8 | — | — | — | — | — |
| Sb₂O₃ | — | — | — | 3.5 | 4.5 | 5.0 | — | — |
| Al₂O₃ | 1.8 | 1.5 | — | 1.5 | 0.8 | — | — | — |
| P₂O₅ | 32.5 | 35.0 | 33.0 | 33.7 | 35.0 | 33.0 | 32.0 | 35.0 |
| Bi₂O₃ | — | — | — | — | — | — | 2.0 | — |
| SnO | — | — | — | — | — | — | — | 7.5 |

|  | 9 | 10 | 11 | 12 | 13 | 14 | 15 | 16 |
|---|---|---|---|---|---|---|---|---|
| Li₂O | 7.0 | 7.0 | 7.0 | 7.0 | 7.0 | 7.0 | 7.0 | 7.0 |
| Na₂O | 8.0 | 8.0 | 8.0 | 8.0 | 8.0 | 8.0 | 8.0 | 8.0 |
| K₂O | 5.0 | 5.0 | 5.0 | 5.0 | 5.0 | 5.0 | 5.0 | 5.0 |
| ZnO | 11.2 | 12.5 | 17.3 | 25.4 | 24.0 | 20.1 | 24.7 | 25.1 |
| BaO | 6.3 | 12.5 | 15.0 | 15.0 | — | 7.5 | 6.8 | 10.2 |
| CaO | 18.8 | 12.5 | 5.0 | — | 15.0 | 7.5 | 7.5 | 3.8 |
| PbO | 8.4 | 7.0 | 6.5 | — | — | 8.1 | — | — |

TABLE IA-continued (Mole %)

|  | | | | | | | | |
|---|---|---|---|---|---|---|---|---|
| Sb₂O₃ | — | — | — | 3.8 | 5.8 | — | 4.8 | 4.3 |
| Al₂O₃ | 0.4 | 0.5 | 1.2 | 0.9 | 0.3 | 2.8 | 0.6 | 0.7 |
| P₂O₅ | 35.0 | 35.0 | 35.0 | 35.0 | 35.0 | 34.0 | 35.0 | 35.0 |
| CeO₂ | — | — | — | — | — | 0.7 | 1.0 |

|  | 17 | 18 | 19 | 20 | 21 | 22 | 23 | 24 |
|---|---|---|---|---|---|---|---|---|
| Li₂O | 7.0 | 7.0 | 7.0 | 7.0 | 7.0 | 7.0 | 7.2 | 7.0 |
| Na₂O | 8.0 | 8.0 | 8.0 | 8.0 | 8.0 | 8.0 | 10.3 | 8.0 |
| K₂O | 5.0 | 5.0 | 5.0 | 5.0 | 5.0 | 5.0 | 5.1 | 5.0 |
| ZnO | 20.1 | 24.8 | 24.0 | 24.5 | 19.6 | 21.5 | 23.2 | 45.0 |
| BaO | 6.8 | 7.5 | — | 3.8 | 3.7 | 7.5 | 22.0 | — |
| CaO | 7.5 | 7.5 | 15.0 | 11.2 | 11.3 | 7.5 | — | — |
| SnO | — | 1.0 | 1.5 | 1.0 | 1.0 | 1.5 | — | — |
| PbO | 8.1 | — | — | — | 7.4 | 6.5 | — | — |
| Sb₂O₃ | — | 3.7 | 4.2 | 4.1 | — | — | — | — |
| Al₂O₃ | 1.8 | 0.6 | 0.3 | 0.4 | 2.0 | 0.5 | — | — |
| P₂O₅ | 35.0 | 35.0 | 35.0 | 35.0 | 35.0 | 35.0 | 32.2 | 35.0 |
| CeO₂ | 0.7 | — | — | — | — | — | — | — |

|  | 25 | 26 | 27 | 28 | 29 | 30 |
|---|---|---|---|---|---|---|
| Li₂O | 6.0 | 6.8 | 7.0 | 7.0 | 7.0 | 7.0 |
| Na₂O | 7.0 | 7.0 | 8.0 | 8.0 | 8.0 | 8.0 |
| K₂O | 7.0 | 5.2 | 5.0 | 5.0 | 5.0 | 5.0 |
| ZnO | 45.0 | 44.0 | 32.3 | 27.0 | 37.5 | 40.0 |
| BaO | — | — | — | 5.0 | — | — |
| CaO | — | — | — | 5.0 | — | — |
| PbO | — | — | 10.0 | 8.0 | — | — |
| Sb₂O₃ | — | — | — | — | 7.5 | — |
| Al₂O₃ | 2.0 | 1.5 | 2.8 | — | — | — |
| P₂O₅ | 33.0 | 34.0 | 35.0 | 35.0 | 35.0 | 40.0 |
| CeO₂ | — | 1.5 | — | — | — | — |

Table II records the softening point (S.P.) and the annealing point (A.P.) in °C., the linear coefficient of thermal expansion (Exp) over the temperature range 25°–300° C. expressed in terms of $\times 10^{-7}/°C.$, and the refractive index ($n_D$) determined in accordance with measuring techniques conventional in the glass art. Table II also records the weight loss (W.L.) expressed in percent exhibited by the glasses after an immersion for six hours in boiling deionized water and a qualitative analysis of the weatherability of the glasses (Weath) based upon the visual appearance of the glasses after an exposure in a humidity cabinet for 500 hours at 60° C. and 98% relative humidity. A weight loss greater than 0.25% is deemed to reflect unsatisfactory chemical durability, with losses less than 0.1% being greatly preferred. Legends for the weatherability character exhibited include: nc=no change in appearance; xl=extremely light frosted appearance; vl=very light frosted appearance; f=frosted appearance; hf=heavy frosted appearance; ca=caked appearance. The most preferred glasses will exhibit no frosting or haze. Nevertheless, where haze can only be observed when the glass is viewed at a small angle (xl and vl), the glasses will be satisfactory for use in most applications. (When subjected to the above-described weatherability test, the current commercial glass produced under U.S. Pat. No. 4,362,819, supra, exhibits a very light frosted appearance.)

TABLE II

|  | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| S.P. | | | | | | | | | | 428 | 429 | — | — | — | 425 |
| A.P. | 319 | 315 | 307 | 337 | 317 | 322 | 307 | — | 323 | 319 | 320 | 326 | 321 | 332 | 321 |
| Exp | 153 | 161 | 157 | 152 | 147 | 151 | 170 | 160 | 163 | 166 | 159 | 153 | 143 | 144 | 147 |
| $n_D$ | 1.606 | 1.608 | 1.608 | 1.606 | 1.606 | 1.609 | 1.605 | 1.599 | 1.603 | 1.603 | 1.605 | 1.611 | 1.612 | 1.610 | 1.610 |
| W.L. | <0.01 | <0.01 | <0.01 | <0.01 | <0.01 | 0.01 | <0.01 | 0.02 | 0.08 | 0.10 | — | — | — | — | <0.01 |
| Weath | nc | nc | vl | nc | vl | vl | nc | nc | xl | nc | xl | xl | vl | xl | nc |

|  | 16 | 17 | 18 | 19 | 20 | 21 | 22 | 23 | 24 | 25 | 26 | 27 | 28 | 29 | 30 |
|---|---|---|---|---|---|---|---|---|---|---|---|---|---|---|---|
| S.P. | 426 | 426 | — | — | — | — | — | 406 | 381 | | | | | | |

TABLE II-continued

| A.P. | 322 | 324 | 325 | 328 | 323 | 335 | 313 | 310 | 289 | 320 | 325 | 305 | 285 | 291 | 278 |
|---|---|---|---|---|---|---|---|---|---|---|---|---|---|---|---|
| Exp | 147 | 149 | 146 | 152 | 143 | 148 | 155 | — | 169 | — | 134 | 153 | 152 | — | 153 |
| $n_D$ | 1.610 | 1.608 | 1.603 | 1.601 | 1.603 | 1.605 | 1.606 | 1.583 | 1.562 | 1.56 | 1.57 | 1.609 | 1.603 | 1.618 | 1.550 |
| W.L. | <0.01 | <0.01 | 0.01 | 0.01 | <0.01 | <0.01 | 0.01 | 0.09 | 0.5 | — | — | 0.01 | 0.2 | 0.6 | 25 |
| Weath | nc | xl | nc | nc | nc | nc | nc | nc | — | f | f | f | hf | ca | — |

As can be observed from the above Tables, Examples 24–30 illustrate glasses having compositions somewhat outside of the ranges providing glasses exhibiting the desired chemical and physical properties. That is, because of the lack of control of the amounts and the interrelationships existing between the individual components, one or more of the properties listed in Table II will not be satisfactory.

Based upon an overall appraisal of the chemical and physical properties demonstrated by the inventive glasses along with their melting and forming characteristics, the preferred glasses consist essentially, in mole percent on the oxide basis, of

| | | | |
|---|---|---|---|
| $Li_2O$ | 6–10 | $P_2O_5$ | 32–36 |
| $Na_2O$ | 6–10 | $Al_2O_3$ | 0–3 |
| $K_2O$ | 4–6 | $CeO_2$ | 0–2 |
| $Li_2O + Na_2O + K_2O$ | 18–22 | SnO | 0.5–2 |
| ZnO | 15–33 | PbO | 0–10 |
| CaO | 6–15 | $Sb_2O_3$ | 3–12 |
| SrO | 0–10 | $Bi_2O_3$ | 0–3 |
| BaO | 0–10 | $SnO + PbO + Sb_2O_3 + Bi_2O_3$ | 3.5–14 |
| CaO + SrO + BaO | 12–20 | | |

The most preferred composition is Example 20.

Although the inventive glasses were designed especially for being press molded into optically finished lenses, their chemical and physical properties recommend their utility in preparing glass-plastic alloys of the type described in U.S. Ser. No. 07/403,655, filed Sept. 11, 1989 under the title GLASS/GLASS-CERAMIC-PLASTIC ALLOY ARTICLES by W. A. Bahn et al. Example 23 is a very satisfactory glass composition in all respects except that its refractive index is below 1.605. Such glass, however, would function very well in forming glass-plastic alloys of the type described by Bahn et al.

I claim:

1. A glass having a composition which is essentially fluorine-free exhibiting an annealing point between 300°–340° C., a linear coefficient of thermal expansion (25°–300° C.) between 145–170×10$^{-7}$/°C., and a weight loss after exposure to boiling water for six hours no greater than 0.25% consisting essentially, expressed in terms of mole percent on the oxide basis, of:

| | | | |
|---|---|---|---|
| $Li_2O$ | 5–10 | $P_2O_5$ | 30–36 |
| $Na_2O$ | 5–15 | $Al_2O_3$ | 0–5 |
| $K_2O$ | 0–6 | $CeO_2$ | 0–2 |
| $Li_2O + Na_2O + K_2O$ | 15–25 | SnO | 0–20 |
| ZnO | 10–33 | PbO | 0–20 |
| CaO | 0–20 | $Sb_2O_3$ | 0–12 |
| SrO | 0–20 | $Bi_2O_3$ | 0–6 |
| BaO | 0–20 | $SnO + PbO + Sb_2O_3 + Bi_2O_3$ | 0–20 |
| CaO + SrO + BaO | 12–25 | | |

2. A glass according to claim 1 exhibiting a refractive index of about 1.605.

3. A glass according to claim 1 consisting essentially of:

| | | | |
|---|---|---|---|
| $Li_2O$ | 6–10 | $P_2O_5$ | 32–36 |
| $Na_2O$ | 6–10 | $Al_2O_3$ | 0–3 |
| $K_2O$ | 4–6 | $CeO_2$ | 0–2 |
| $Li_2O + Na_2O + K_2O$ | 18–22 | SnO | 0.5–2 |
| ZnO | 15–33 | PbO | 0–10 |
| CaO | 6–15 | $Sb_2O_3$ | 3–12 |
| SrO | 0–10 | $Bi_2O_3$ | 0–3 |
| BaO | 0–10 | $SnO + PbO + Sb_2O_3 + Bi_2O_3$ | 3.5–14 |
| CaO + SrO + BaO | 12–20 | | |

4. A glass according to claim 3 exhibiting a refractive index of about 1.605.

5. A lens prepared from a glass having a composition which is essentially fluorine-free exhibiting an annealing point between 300°–340° C., a linear coefficient of thermal expansion (25°–300° C.) between 145–170×10$^{-7}$/°C., and a weight loss after exposure to boiling water for six hours no greater than 0.25% consisting essentially, expressed in terms of mole percent on the oxide basis, of:

| | | | |
|---|---|---|---|
| $Li_2O$ | 5–10 | $P_2O_5$ | 30–36 |
| $Na_2O$ | 5–15 | $Al_2O_3$ | 0–5 |
| $K_2O$ | 0–6 | $CeO_2$ | 0–2 |
| $Li_2O + Na_2O + K_2O$ | 15–25 | SnO | 0–20 |
| ZnO | 10–33 | PbO | 0–20 |
| CaO | 0–20 | $Sb_2O_3$ | 0–12 |
| SrO | 0–20 | $Bi_2O_3$ | 0–6 |
| BaO | 0–20 | $SnO + PbO + Sb_2O_3 + Bi_2O_3$ | 0–20 |
| CaO + SrO + BaO | 12–25 | | |

6. A lens according to claim 5 wherein said glass exhibits a refractive index of about 1.605.

7. A lens according to claim 5 prepared from a glass having a composition consisting essentially of:

| | | | |
|---|---|---|---|
| $Li_2O$ | 6–10 | $P_2O_5$ | 32–36 |
| $Na_2O$ | 6–10 | $Al_2O_3$ | 0–3 |
| $K_2O$ | 4–6 | $CeO_2$ | 0–2 |
| $Li_2O + Na_2O + K_2O$ | 18–22 | SnO | 0.5–2 |
| ZnO | 15–33 | PbO | 0–10 |
| CaO | 6–15 | $Sb_2O_3$ | 3–12 |
| SrO | 0–10 | $Bi_2O_3$ | 0–3 |
| BaO | 0–10 | $SnO + PbO + Sb_2O_3 + Bi_2O_3$ | 3.5–14 |
| CaO + SrO + BaO | 12–20 | | |

8. A lens according to claim 7 wherein said glass exhibits a refractive index of about 1.605.

* * * * *